April 16, 1957  R. SEGUIN  2,788,523
ANTI-DAZZLE DEVICE FOR VEHICLE DRIVERS, CYCLISTS AND PEDESTRIANS
Filed Nov. 24, 1952  2 Sheets-Sheet 2
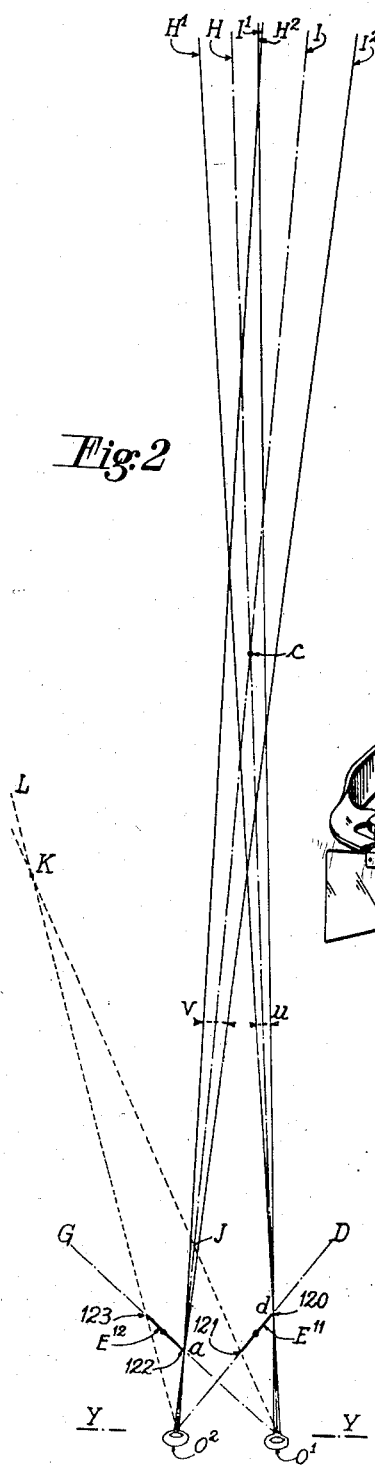
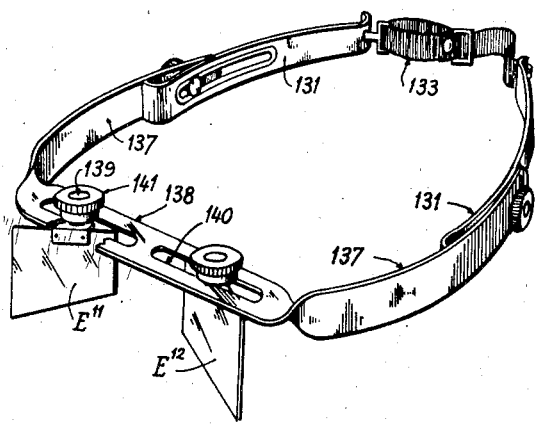
Inventor
Raymond Seguin
by: J. Delattre-Seguin
Attorney United States Patent Office 2,788,523
Patented Apr. 16, 1957

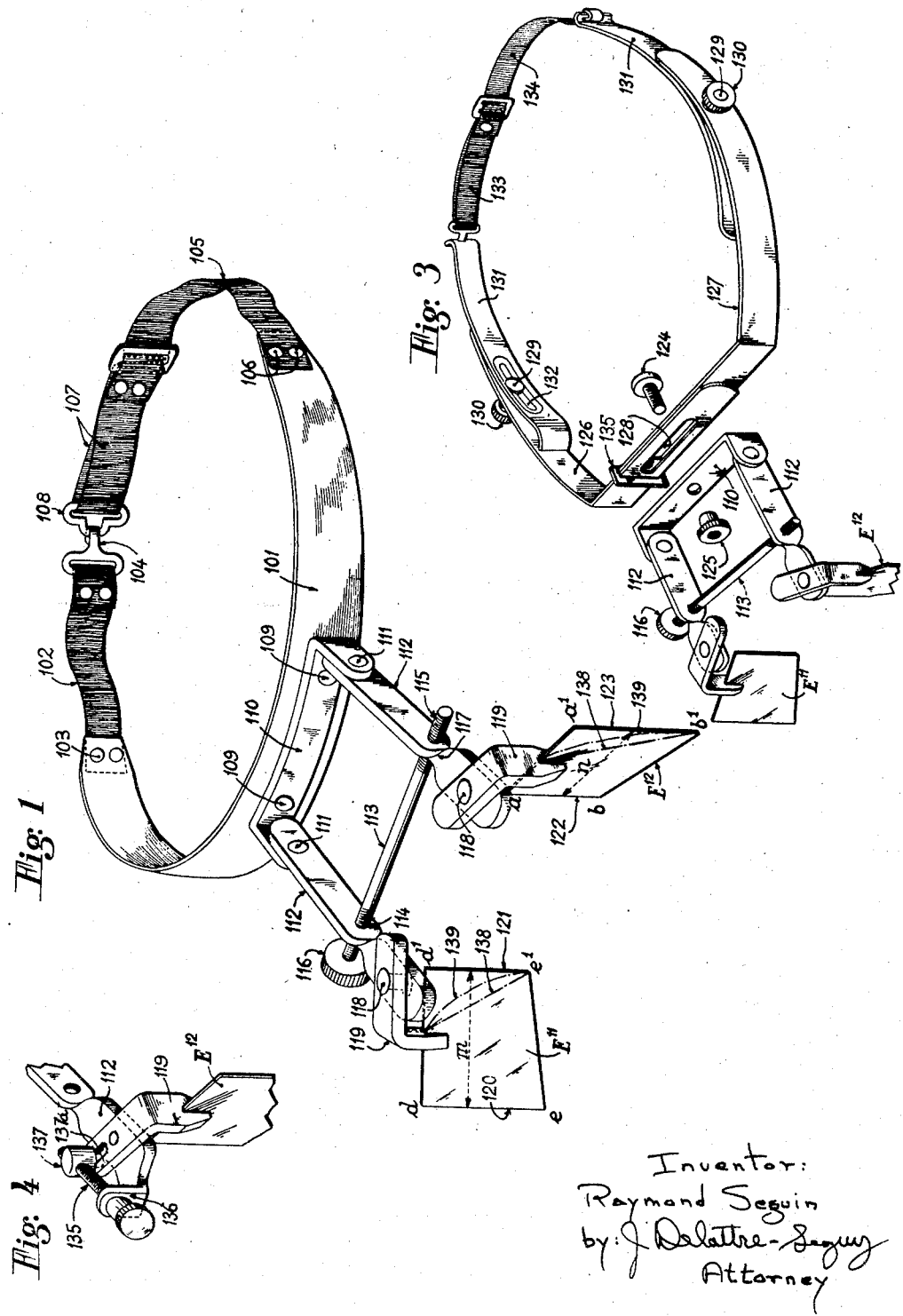

2,788,523
ANTI-DAZZLE DEVICE FOR VEHICLE DRIVERS, CYCLISTS, AND PEDESTRIANS

Raymond Seguin, Golfe-Juan, France

Application November 24, 1952, Serial No. 322,228

Claims priority, application France November 26, 1951

3 Claims. (Cl. 2—12)

The invention relates to anti-dazzle devices for persons using the highways at night (vehicle driver, cyclist, or pedestrian). These devices prevent the user from being blinded or dazzled by the lights of an oncoming vehicle or by the reflection of the light beams in puddles on a wet road, without it being necessary for the wearer to use his hands and without any interference with the normal conditions of vision.

Devices are known which comprise in combination, a support adapted to be secured in an adjustable position on the head of the user, one part at least of this support being in front of, and very near, the forehead of the user, two small screens for masking off at least a portion of the light beam directed toward them, each of these screens having an area of one to several square centimeters and being carried by the aforementioned part of the support so that they downwardly extend from it, the screen edges directed toward the side of the device corresponding to the side of a highway on which traffic regulations require vehicles to travel (i. e. right side in the case of right-hand driving) being disposed substantially vertically when the device is in the position of use, and these screens being placed in front of the user's eyes at a very short distance therefrom (of the order of one centimetre) parallel to the user's face.

In such a device comprising screens so close to the eyes, the screens blur or partially mask off a large area of vision which in practice detracts from the complete efficiency of the device. This is due to the two angles which the pupils of the eyes of the observer subtend at a point situated on the vertical side edge of the corresponding screen.

The present invention has for its object a device of this type but improved so as to considerably diminish this area of blurred or imperfect vision.

This is achieved due to the fact that the support is forwardly extended by at least five centimetres from the part or parts of said support adapted to contact the head of the user.

This increase in the distance of the screens from the eyes of the user permits a decrease in the two above-mentioned angles and, in consequence, a decrease in the zone of imperfect vision caused by the two screens, this zone being practically eliminated when the abovementioned distance reaches at least five centimetres.

The invention has for a further object to provide a device of the aforementioned type in which the screens, instead of being disposed transversely in the same plane parallel to the front portion of the support, are disposed obliquely relative to this plane so that each one of them is seen in profile by the eye not corresponding thereto when the user glances sideways toward this screen.

In this arrangement, the screens do not hinder the side vision of the user.

Other features of the invention will appear from the ensuing description.

In the accompanying drawings:

Fig. 1 is a perspective view of a first embodiment of a device improved in accordance with the invention.

Fig. 2 is a diagram, in plan, showing the very reduced zones of imperfect vision due to the screens.

Fig. 3 is a perspective view of a modification.

Fig. 4 is a partial perspective view showing a special arrangement adaptable on either of the embodiments represented in Figs. 1 to 3.

Fig. 5 is a perspective view of another modification.

In the embodiment represented in Fig. 1, the device comprises a support including a strap 101 in leather, cloth, rubber, or preferably in a plastic material such as a vinyl resin, a superpolyamide, etc. This strap is provided at the rear with means permitting it to be fixed against the forehead of the user. This means comprises two elastic bands, one 102 fixed to one of the ends of the support 101 by means of rivets 103 and/or stitching or gluing and provided at its other free end with a hook 104. The other elastic band 105 is fixed at 106 in a similar way to the other end of the support 101 and includes an adjustable buckle 107 in which a metal hooking buckle 108 is adapted to slide.

In the middle of the support 101 is attached, by means of rivets 109 and/or gluing or otherwise, a U-shaped member 110 in metal or, preferably, in any synthetic transparent substance possessing some resiliency.

On the two branches of the U-shaped member 110 are pivotally mounted on two coaxial pivot pins 111, for example in the form of two rivets, two links 112 constituting two parallel arms. These links 112 are connected at a point intermediate of their length by a tie-rod 113 having two threaded portions 114 and 115 one having a left-hand thread and the other right-hand. These threaded portions are screwed in two tapped holes provided in the links 112, so that in rotating the tie-rod 113 in one direction these links may be brought closer together, and in rotating it in the other direction, they may be spread apart. The flexibility of the arms of the U-shaped member 110 and/or of the links 112 allow this adjustment.

Means are provided on the tie-rod 113 for the rotation of the latter and consists in the illustrated embodiment in a wheel 116 solid with, keyed, or otherwise fixed to, this tie-rod.

The two links 112 are twisted near their ends distant from the support 110 at 117 so as to bring their sides in the same plane. On these ends are jointed, for example by means of rivets 118, two L-shaped screen holders 119, each one of which carries one of the small screens $E^{11}$ and $E^{12}$.

By means of these screen holders, which may pivot about the axes of the rivets 118, the screens may be given an obliquity in plan relative to a plane passing through the front part of the support, i. e. relative to a plane YY passing through the eyes $O^1$ and $O^2$ of the user.

The obliquities of the two screens are chosen to be opposite in direction and such that each screen $E^{11}$ or $E^{12}$ is viewed from its edge, i. e. seen in profile by the other eye $O^2$ or $O^1$ of the user when the user glances sideways either to the right in the direction $O^2D$ or to the left in the direction $O^1G$.

Preferably, the links 112, the tie-rod 113, the screen holders 119, and the rivets 118 or other jointing means, are in a transparent synthetic material so as not to hinder the vision of the user should he need to look through these pieces. Thus, these pieces may, like the support 110 and the strap 101, be in a polyvinyl resin, a superpolyamide, or any other similar material that is transparent, relatively resilient, and unbreakable.

The screens $E^{11}$ and $E^{12}$ are either opaque, in metal, cardboard, or synthetic substance, or transparent (glass or, preferably, uncoloured and unbreakable synthetic substance), or translucid, or more or less coloured on the surface or throughout.

The screens $E^{11}$ and $E^{12}$ are unpolished on their rear sides facing the face of the user so as to avoid any reflection of light coming from the side which might interfere with a good visibility for the user.

The unpolished surface might be obtained either with a mat surface screen or by covering the screen with fine black cloth applied to the rear surface of the screen so as to prevent any reflection while leaving a certain transparency that permits the oncoming lights or other light source to be dimly perceived.

These screens have, when seen from the front, a trapezoidal shape so as to take into account the effect of perspective caused by the fact that in their position of use they are disposed obliquely relative to the front plane YY (Fig. 2).

For the screen $E^{11}$ on the right (seen from the user), the rectilinear right side 120 has a length $de$ which is greater than $d'e'$ of the left side 121. For the screen $E^{12}$ on the left, however, the right side 122 has a length $ab$ which is smaller than that of $a'b'$ of the left side.

Furthermore, since the side 120 in practice is further from the eye $O^1$ than the side 122 (owing to the obliquity) is from the eye $O^2$, the length $de$ is greater than the length $ab$ (Fig. 2).

For example, taking screens having their edges 120 and 122 situated from the eyes $O^1$ and $O^2$ at distances of 110 mm. and 70 mm. respectively, and having widths $m$ and $n$ both equal to 60 mm., the following remaining dimensions might advantageously be adopted:

$de = 25$ mm.
$d'e' = 20$ mm.
$ab = 20$ mm.
$a'b' = 25$ mm.

The device is employed in the following manner. The user fixes it around his head so that the strap 101 is applied against his forehead. He adjusts the direction of the links 112 about the pivots 111 so that the lower edges $ee'$, $bb'$ of the screens $E^{11}$ and $E^{12}$ are situated above his field of vision when he holds his head in the normal vertical position, but so that they intersect this field when he forwardly inclines his head.

Further, the obliquities of the screens relative to the front plane YY (Fig. 2) are adjusted as hereinbefore mentioned so that neither of these screens interferes with his side vision in the direction $O^1G$ or $O^2D$.

Finally, assuming the user is situated along the centre line of the highway, he turns the tie-rod 113 in the correct direction to bring the screens together or to separate them so that the middle lines of sight such as $O^1dH$ and $O^2aI$ passing through the centres of the pupils of his eyes $O^1$ and $O^2$ and through the rectilinear, vertical, right hand sides 120 and 122 of the screens $E^{11}$ and $E^{12}$, intersect on the highway before him on a vertical line C.

Under these conditions, if the pupils of the user were reduced to a point, the whole of the region contained within the zone HCJKL (Fig. 2) would be masked off from the user and a vehicle approaching him in that zone would not dazzle him with its lights. But in actual fact this is not quite the case owing to the size of the pupils. For the right eye $O^1$, the ray $O^1H$ constitutes but the centre line of a zone defined by the two rays $O^1H^1$ and $O^1H^2$ impinging on the right and left edges of the pupil and between them forming an angle $u$. Similarly, for the left eye $O^2$, the two rays $O^2aI^1$ and $O^2aI^2$ form between them an angle $v$. The two triangular zones, having for apices the angles $u$ and $v$, overlap and together result in a zone of blurred vision.

It will be observed that this zone of blurred vision decreases as the angles $u$ and $v$ decrease, i. e. as the distances of the edges 120 and 122 of the screens from the eyes $O^1$ and $O^2$ increase.

The above-described construction enables the user to move, by means of the two links 112, the screens away from the eyes and to obtain thereby a very small zone of blurred vision which is practically imperceptible (the angles $u$ and $v$ have been considerably enlarged in the Fig. 2 to render the drawing more clear). An anti-dazzle zone of shade which has clear, unblurred edges is therefore obtained.

In Fig. 3 a modification is shown in which the distance of the screens from the eyes may be increased still more. This is achieved in fixing the support 110 in a movable way on a rigid mounting by means of a bolt 124 and nut 125. This rigid mounting is formed of two L-shaped members 126 and 127 each of which comprises a rectilinear portion and an arced portion. Preferably, one of the L-shaped members, for instance the member 127, includes at the end of its rectilinear portion a rectangular eyelet 135 in which the rectilinear portion of the other L-shaped member is adapted to slide. These L-shaped members are connected together by a bolt 124 which passes through the front rectilinear portions of these members which are provided with slots 128 that allow the distance between the arced portions of these members to be adjusted.

On these arced portions are fixed in an adjustable position, by means of bolts 129 and nuts 130, two resilient members 131 constituting a head-grip which is longitudinally adjustable with respect to the user's head owing to the elongated holes 132 provided in these resilient members 131. These members are arced so as to bear laterally against the scalp of the user. They may be tightened by means of an adjustable rear strap in the form of an elastic band 133.

On the inner face of each resilient member 131 may be applied a thin strip of ribbed rubber or like material so as to prevent the member 131 from slipping on the hair.

By adjusting the small bolts 129 in the elongated holes 132, the user may regulate the distance between his forehead and the rectilinear branches of the L-shaped members 127 and, in doing so, regulate the distance between the screens and his eyes. The more or less wide space between the members 126 and 127 enables the user to adapt the head grip to the width of his head.

In Fig. 4 a modification is shown in which the angular positioning of each screen, for instance the screen $E^{12}$, is made easier by a screw 135 journalled in a lug 136 on the twisted end of the link 112 and screwed into a tapped stud 137 which is adapted to slide in a slot 137a provided in the screen holder 119.

In the above-described embodiments the screens have been represented as trapezoidal, but only the right edge 120, 122 needs to be substantially rectilinear and vertical in the case of routes on which the traffic travels on the right hand side. The screens could be cut on their left side as shown in chain-dot lines in Fig. 1 along an oblique straight line 138 or a curvilinear or similar line 139 thereby permitting a clear vision of the left side of the road beyond the zone of the path of the vehicle to mask off.

In Fig. 5 another modification is shown, which is similar to the embodiment in Fig. 3 so far as the side supports 131 are concerned. In this instance, however, the front part is formed of a single U-shaped piece which comprises two arms 137 which are adjustable in position with respect to the side members 131 and are of such length that the central part 138 is sufficiently spaced away from these members 131 in the forward direction that it may be a sufficient distance from the forehead of the user to allow the angularly adjustable screens $E^{11}$ and $E^{12}$ to be pivotally mounted by means of pins 139 directly in slots 140 provided in this central part. This central part 138 is twisted so as to be horizontal in the position of use. The slots 140 permit the adjustment of the distance between the screens, the latter being fixed in position by means of nuts 141 screwed on the pins 139 which are threaded for this purpose.

The invention is not limited to the details of construction described and illustrated in the accompanying drawings which have been given merely by way of example.

The described devices apply to highways on which the traffic travels on the right hand side. For left hand driving, the devices should be symmetrical to those described.

Having now described my invention what I claim as new and desire to secure by Letters Patent is:

1. Anti-dazzle device for highway user, comprising in combination: a support adapted to be fixed in an adjustable and substantially horizontal position around the head of said user, said support comprising a front frontal portion, an extension composed of a main member fixed to the frontal portion of said support; two resilient links pivotably mounted on said main member about an axis so disposed that when the support is in position on the head of the user, said axis is horizontal and positioned in front of the forehead of the user, and two small substantially opaque screens mounted on the front end of said links respectively and pivotable in opposition to friction about an axis perpendicular to said first mentioned axis; said screens being positioned to extend downwardly from said links, the latter having such length that the lateral edges of the screens, that are directed toward the side of the device which corresponds to the side of the traveling lane for said user, are situated at a distance of at least five centimeters from said front frontal portion; said screens being obliquely disposed relative to said frontal portion, their obliquity being such that each screen is seen in profile from a point with which the pupil of the eye on the opposite side would coincide, when the user is using the device; said screens then diverging from each other forward of the user; and means for adjusting the distance between the front end of said links and consequently the distance between said lateral edges of said screens.

2. Anti-dazzle device as claimed in claim 1, in which said means comprises, a rod the ends of which are screw-threaded in opposite directions and are screwed into tapped holes provided in the links, and a control knob provided at one end of this rod.

3. Anti-dazzle device for highway user, comprising in combination: a support adapted to be fixed in an adjustable and substantially horizontal position around the head of said user, said support comprising a front frontal portion, an extension composed of a main member fixed to said frontal portion; two resilient links pivotably mounted on said main member about an axis so disposed that when the support is in position on the head of the user, said axis is horizontal and positioned in front of the forehead of the user, and two small substantially opaque screens mounted on the front end of said links respectively and pivotable in opposition to friction about a second axis perpendicular to said first mentioned axis; said screens being positioned to extend downwardly from said links, the latter having such length that the lateral edges of the screens that are directed toward the side of the device which corresponds to the side of the legal travelling lane for said user are situated at a distance of at least five centimeters from said front frontal portion; said screens being obliquely disposed relative to said frontal portion, their obliquity being such that each screen is seen in profile from a point with which the pupil of the eye on the opposite side would coincide, when the user is using the device; said screens then diverging from each other forward of the user; and an L-shaped lever jointed by one of its arms on the front end of each link, the other one of its arms forming a fork portion in which one of said screens is engaged and fixed.

References Cited in the file of this patent
UNITED STATES PATENTS

| | | |
|---|---|---|
| 1,502,820 | Funk | July 29, 1924 |
| 1,577,700 | Edwards | Mar. 23, 1926 |
| 1,768,597 | Gwathmey | July 1, 1930 |
| 2,286,219 | Martinek | June 16, 1942 |
| 2,396,510 | Hulst | Mar. 12, 1946 |
| 2,643,381 | Abbott | June 30, 1953 |